US008799707B2

(12) United States Patent
Takatsudo et al.

(10) Patent No.: US 8,799,707 B2
(45) Date of Patent: Aug. 5, 2014

(54) REDUNDANT SYSTEM

(75) Inventors: Yasuhiro Takatsudo, Kanagawa-ken (JP); Kiyoshi Ishii, Hyogo-ken (JP); Kenichi Morimoto, Tokyo (JP); Fumikado Anzai, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 468 days.

(21) Appl. No.: 13/170,484

(22) Filed: Jun. 28, 2011

(65) Prior Publication Data

US 2013/0007514 A1    Jan. 3, 2013

(51) Int. Cl.
*G06F 11/00* (2006.01)

(52) U.S. Cl.
USPC .......................................................... 714/11

(58) Field of Classification Search
None
See application file for complete search history.

(56) References Cited

U.S. PATENT DOCUMENTS

| 4,967,347 | A | * | 10/1990 | Smith et al. | 714/12 |
| 6,173,229 | B1 | * | 1/2001 | Fennel et al. | 701/91 |
| 6,449,732 | B1 | * | 9/2002 | Rasmussen et al. | 714/12 |
| 7,292,897 | B2 | * | 11/2007 | Miura et al. | 700/3 |

FOREIGN PATENT DOCUMENTS

| JP | 6031669 A | 2/1985 |
| JP | 60-189002 A | 9/1985 |
| JP | 62-075705 A | 4/1987 |
| JP | 63271540 A | 11/1988 |
| JP | 1288928 A | 11/1989 |
| JP | 4-15704 U | 2/1992 |
| JP | 8185329 A | 7/1996 |
| JP | 3085917 B2 | 9/2000 |
| JP | 3229070 B2 | 11/2001 |
| JP | 3346283 B2 | 11/2002 |
| JP | 2003-157102 A | 5/2003 |
| JP | 2006209565 A | 8/2006 |

OTHER PUBLICATIONS

Office Action mailed Nov. 26, 2013, corresponds to Japanese patent application No. 2009-141567.
Decision to Grant a Patent mailed Jun. 3, 2014, corresponds to Japanese patent application No. 2009-141567.

* cited by examiner

*Primary Examiner* — Michael Maskulinski
(74) *Attorney, Agent, or Firm* — Manabu Kanesaka; Benjamin J. Hauptman

(57) ABSTRACT

The reliability of output data is enhanced, and the frequency of stopping arithmetic devices is reduced. A redundant system includes an input device; a plurality of arithmetic devices that receive input data from the input device; and an output device that receives output data output from the arithmetic devices, the redundant system causing the arithmetic devices to perform the same processing. Each of the arithmetic devices includes: a first communication unit that acquires the input data from the input device; and a second communication unit that sends the input data acquired by the first communication unit to other arithmetic device and receives the input data acquired by the other arithmetic device from the other arithmetic device.

7 Claims, 6 Drawing Sheets

DESCRIPTION OF SYMBOLS IN STORAGE DEVICE (x=a, b, c, d)
5x INPUT: INPUT DATA OF ARITHMETIC DEVICE 5x
5x INTERMEDIATE: INTERMEDIATE VALUE DATASET
 OF ARITHMETIC DEVICE 5x
5x INTERMEDIATE VALUE DATASET: INTERMEDIATE VALUE DATASET
 OF ARITHMETIC DEVICE 5x
5x OUTPUT DATA: OUTPUT DATA OF ARITHMETIC DEVICE 5x

DESCRIPTION OF SYMBOLS IN STORAGE DEVICE (n=a, b, c, d)
5x INPUT: INPUT DATA OF ARITHMETIC DEVICE 5x
5x CRC: CRC OF INTERMEDIATE VALUE DATASET
    OF ARITHMETIC DEVICE 5x
5x INTERMEDIATE VALUE DATASET: INTERMEDIATE VALUE DATASET
                                OF ARITHMETIC DEVICE 5x
5x OUTPUT DATA: OUTPUT DATA OF ARITHMETIC DEVICE 5x

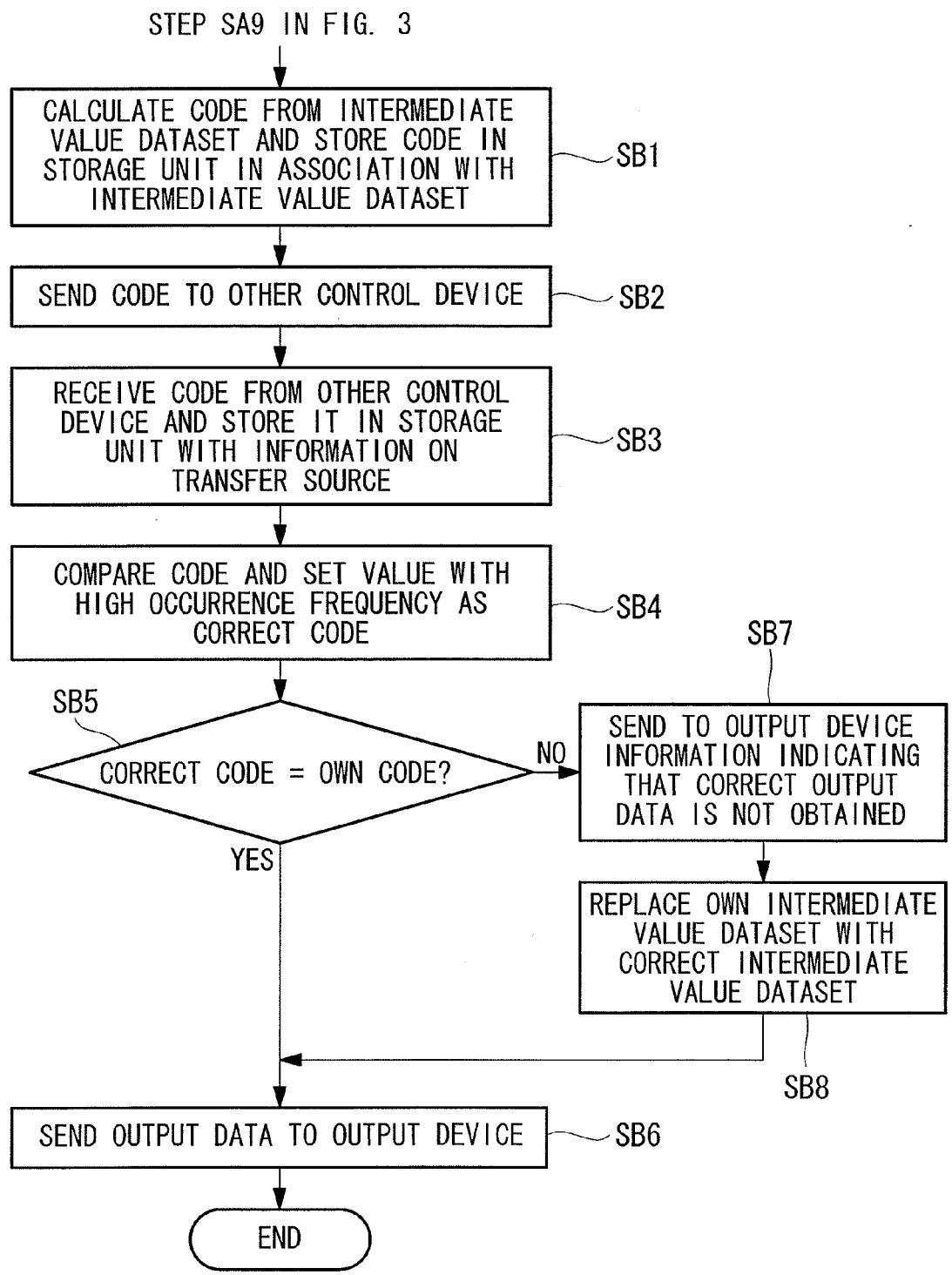

REDUNDANT SYSTEM

RELATED APPLICATIONS

The present application is based on Japanese Application Number 2009-141567, filed Jun. 12, 2009.

TECHNICAL FIELD

The present invention relates to a redundant system.

BACKGROUND ART

A redundant system has been proposed, having redundantly configured arithmetic devices for controlling, for example, a plant process to perform control so that the plant function is not lost even when some of the arithmetic devices fail.

Patent Literature 1 discloses a method of determining a control variable by a triplex control system including three redundant arithmetic devices, in which the intermediate value of three calculation results output from the respective arithmetic devices is determined to be a control variable when the three calculation results do not match, whereas high-value selection or low-value selection is performed when the triplex system is switched to a duplex system because one of the three arithmetic devices has stopped.

CITATION LIST

Patent Literature

{PTL 1}
Japanese Unexamined Patent Application, Publication No. 2003-157102

SUMMARY OF INVENTION

Technical Problem

However, the invention described in Patent Literature 1 is problematic in that a larger error is generated when the calculation results from the plurality of arithmetic devices differ than when all calculation results match, thus leading to lower data reliability.

In addition, the conventional arithmetic devices have a lower availability factor because they are regarded as malfunctioning and stop in response to not only abnormalities with the arithmetic devices themselves but also missing or corrupted input/output data resulting from a temporary failure in the communication medium, serving as a path for input/output data.

The present invention has been conceived in light of the above-described problems, and an object thereof is to provide a redundant system that is capable of increasing the reliability of output data and reducing the frequency of stopping of the arithmetic devices.

Solution to Problem

To solve the above-described problems, the present invention provides the following solutions.

The present invention provides a redundant system including: an input device; a plurality of arithmetic devices that receive input data from the input device; and an output device that receives output data output from the arithmetic devices, the redundant system causing the arithmetic devices to perform the same processing, wherein each of the arithmetic devices includes: a first communication unit that acquires the input data from the input device; and a second communication unit that sends the input data acquired by the first communication unit to another arithmetic device and receives the input data acquired by the other arithmetic device from the other arithmetic device.

According to such a structure, the input data acquired via the first communication unit in each arithmetic device is sent to and received from the other via the second communication unit. As a result, each arithmetic device can acquire the input data sent to the other arithmetic device. For this reason, the input data acquired by the other arithmetic device can be obtained via the second communication unit even when the input data from the input device cannot be acquired due to, for example, a communication failure between the input device and the first communication unit. This ensures that the input data can be acquired.

The above-described redundant system may include: at least three of the arithmetic devices, wherein each of the arithmetic devices includes a data selecting unit that, if at least one of the input data acquired via the first communication unit and the second communication unit does not match, selects a value with the highest occurrence frequency from among at least three of the input data as changed input data.

Assuming that, for example, three arithmetic devices are provided, when the input data input from the first communication unit contains an error and the two input data input from the second communication unit are correct (free of error) in a first arithmetic device, the correct (error-free) input data, that is, a value with a high occurrence frequency from among the three input data, is selected as the changed input data. Because the input data is changed according to the number of identical input data items in this manner, the reliability of the input data can be maintained more than when the input data is obtained through average selection or low-value selection as is done conventionally.

Each of the arithmetic devices in the redundant system may include: a control/arithmetic unit that calculates the output data by performing a predetermined arithmetic operation based on the input data; and a storage unit that stores an intermediate value dataset, which is a plurality of data items obtained during the process of calculating the output data, wherein the second communication unit sends the intermediate value dataset stored in the storage unit to the other arithmetic device and receives the intermediate value dataset sent from the other arithmetic device, and the storage unit stores the intermediate value data received from the other arithmetic device in association with the input data.

According to such a structure, the intermediate value dataset is sent and received among the arithmetic devices, and the intermediate value dataset generated in each arithmetic device is stored in its storage unit. As a result, its own intermediate value dataset can be compared against the intermediate value dataset in the other arithmetic device, and, for example, if there is different intermediate value data, the difference in the output data can be detected based on the difference in the intermediate value dataset.

The data selecting unit in the redundant system, if at least one of a plurality of the intermediate value datasets stored in the storage unit does not match, may select a value with the highest occurrence frequency from among the intermediate value datasets as a changed intermediate value dataset and, if the selected intermediate value dataset differs from the intermediate value dataset based on the input data acquired via the first communication unit, may determine that the output data calculated from the input data acquired via the first communication unit is not correct and may set the intermediate value dataset with the highest occurrence frequency as the changed intermediate value dataset.

In this manner, it is determined whether the output data is correct based on the occurrence frequency of the intermediate value dataset stored in the storage unit to select the value with the highest occurrence frequency as a changed intermediate value dataset. Therefore, the reliability of the intermediate value dataset can be maintained. Furthermore, when the intermediate value dataset calculated by itself differs from the intermediate value dataset selected as the updated intermediate value dataset, its own intermediate value dataset is overwritten. Thus, when, for example, the intermediate value dataset is needed again for the subsequent processing, the processing can be performed using the correct intermediate value data.

Each of the arithmetic devices in the redundant system may include: a control/arithmetic unit that calculates the output data by performing a predetermined arithmetic operation based on the input data; a storage unit that stores an intermediate value dataset, which is a plurality of data items obtained during the process of calculating the output data; and a code generating unit that generates one code from the intermediate value dataset stored in the storage unit, wherein the code generating unit may generate the same code for the same intermediate value dataset; the storage unit may store the code and the input data in association with each other; and the second communication unit may send the code stored in the storage unit to the other arithmetic device and acquire the code from the other arithmetic device to store the code in the storage unit in association with the input data acquired from the other arithmetic device.

As described above, one code calculated from the intermediate value dataset containing a plurality of data is sent and received among the arithmetic devices. Therefore, a code corresponding to each intermediate value dataset in the arithmetic devices is acquired and stored in the storage unit.

By doing so, the amount of sent and received data can be reduced more than when the intermediate value dataset is sent and received among the arithmetic devices, thus decreasing the load imposed by data on the communication path. In addition, when the intermediate value dataset is compared among the arithmetic devices, it can be determined whether the intermediate value dataset differs merely by comparing a single code. Therefore, the processing load can be reduced more than when the intermediate value dataset containing a plurality of data is compared.

The data selecting unit in the redundant system, if at least one of the codes stored in the storage unit does not match, may determine that a value with the highest occurrence frequency from among the codes is the correct code and, if the code determined as being correct differs from its own code, may determine that the output data calculated by itself is not correct, in which case the second communication unit may receive the intermediate value dataset from the other arithmetic device, serving as a transfer source of the code determined as being correct, and its own intermediate value dataset stored in the storage unit may be updated with the intermediate value dataset received by the second communication unit.

In this manner, it can be determined easily whether its own intermediate value dataset is erroneous by comparing a code calculated based on the intermediate value dataset stored in the storage unit. Furthermore, when it is determined that the intermediate value dataset is erroneous, the correct intermediate value dataset is acquired from the other arithmetic device, and the erroneous intermediate value dataset stored in the storage unit is updated with the correct intermediate value dataset. Therefore, when, for example, the intermediate value dataset is needed again for the subsequent processing, the processing can be performed using the correct intermediate value data.

Each of the arithmetic devices in the redundant system may include: a control/arithmetic unit that calculates the output data by performing a predetermined arithmetic operation based on the input data; a storage unit that stores an intermediate value dataset, which is a plurality of data items obtained during the process of calculating the output data; and a code generating unit that generates one code from the intermediate value dataset stored in the storage unit, wherein the code generating unit may generate the same code for the same intermediate value dataset; the storage unit may store the code and the input data in association with each other; and the second communication unit may send the code and the intermediate value dataset stored in the storage unit to the other arithmetic device and acquire the code and the intermediate value dataset from the other arithmetic device and stores them in the storage unit in association with the input data acquired from the other arithmetic device.

In this manner, because one code calculated from the intermediate value dataset containing a plurality of data and the intermediate value dataset are sent and received among the arithmetic devices, each intermediate value dataset and the code in the arithmetic devices are acquired and stored in the storage unit.

For example, if it is determined that its own code does not match the code determined as being correct when only a code is sent and received, the process of acquiring the intermediate value dataset from the other arithmetic device, serving as the transfer source of the code determined as being correct, is performed. For this reason, it takes a longer time until the intermediate value dataset is acquired, causing the processing time to become different between when code matching is achieved and when code matching is not achieved. On the other hand, when both the intermediate value dataset and a code are sent and received, the intermediate value dataset received together with the code can be used as-is, regardless of whether its own code matches the code determined as being correct or not. Therefore, variations in processing time among the arithmetic devices can be suppressed.

Furthermore, when, for example, only the intermediate value dataset is sent and received, it takes a longer time to determine whether its own intermediate value dataset matches the intermediate value dataset determined as being correct because a plurality of data need to be compared. On the other hand, when both the intermediate value dataset and a code are sent and received together, it is determined whether the intermediate value dataset matches using one code generated corresponding to the intermediate value dataset. As a result, the time required for determination can be reduced.

Because of these points, sending and receiving both the intermediate value dataset and the code is suitable for arithmetic devices requiring real-time characteristics.

The data selecting unit in the redundant system, if at least one of the codes stored in the storage unit does not match, may determine that a value with the highest occurrence frequency from among the codes is the correct code and, if the code determined as being correct differs from its own code, may determine that the output data calculated by itself is not correct, in which case the intermediate value dataset from the same transfer source as that of the code determined as being correct may be read out from the storage unit, and its own intermediate value dataset stored in the storage unit may be updated with the intermediate value dataset read out from the storage unit.

In this manner, it can be determined easily whether its own intermediate value dataset is erroneous by comparing the code calculated based on the intermediate value dataset stored in the storage unit. Furthermore, when the intermediate value dataset is determined as being erroneous, the correct intermediate value dataset acquired from the other arithmetic device and stored in the storage unit is read out, and the erroneous intermediate value dataset is updated with the correct intermediate value dataset. Therefore, when the intermediate value dataset is needed again for the subsequent processing, the processing can be performed using the correct intermediate value data.

Advantageous Effects of Invention

According to the present invention, an advantage is afforded in that the reliability of the output data is enhanced and that the frequency of stopping of the arithmetic devices can be reduced.

BRIEF DESCRIPTION OF DRAWINGS

FIG. 6 shows an operating flow for a redundant system according to the second embodiment.

DESCRIPTION OF EMBODIMENTS

Embodiments of a redundant system according to the present invention will now be described with reference to the drawings.

{First Embodiment}

Figure 1:
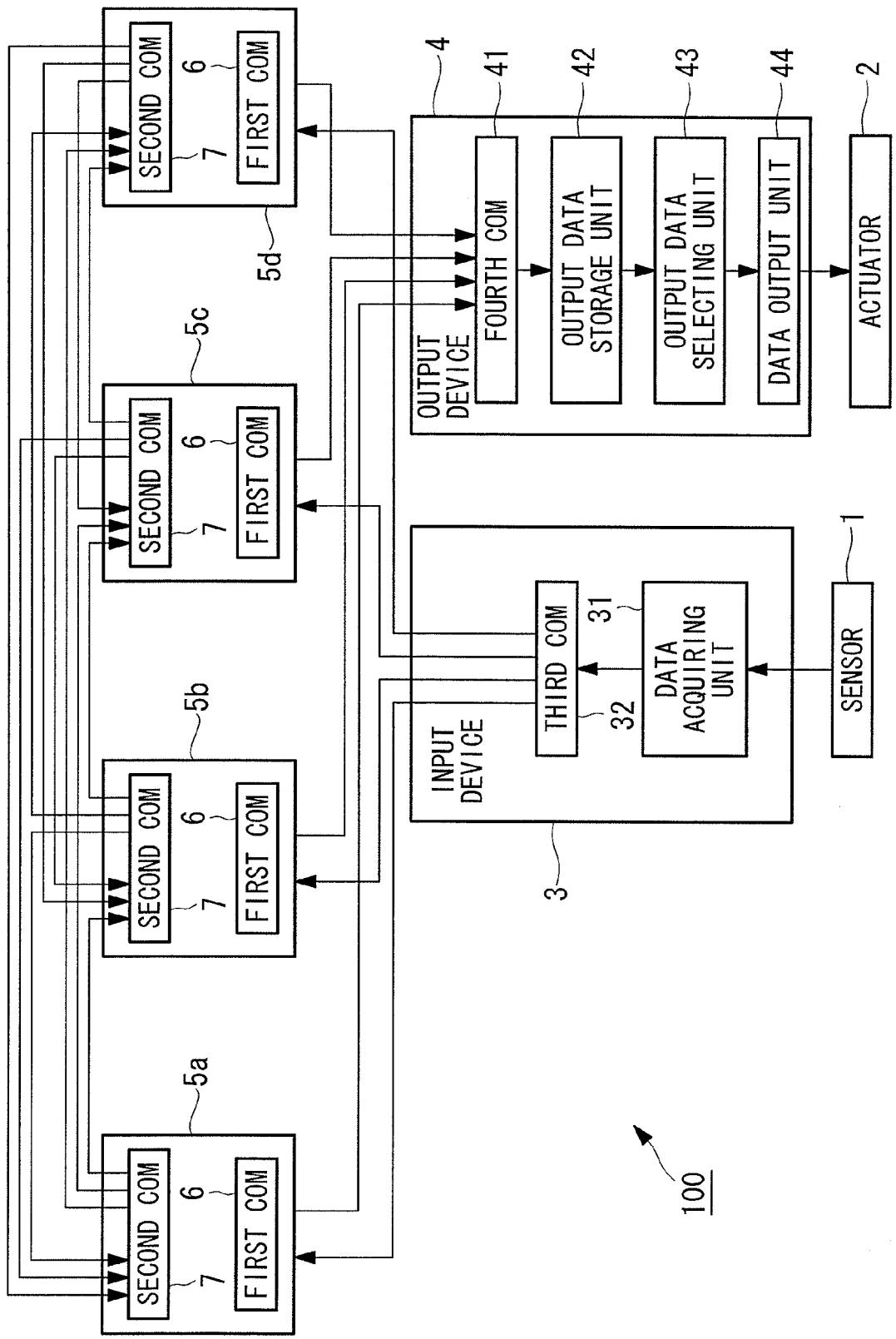
FIG. 1 is a diagram depicting the schematic structure of a redundant system according to a first embodiment of the present invention.

FIG. 1 is a block diagram illustrating the schematic structure of a redundant system 100 according to this embodiment.

As shown in FIG. 1, the redundant system 100 includes an input device 3; an output device 4; and four arithmetic devices 5a, 5b, 5c, and 5d. Via a first communication unit (first COM) 6 thereof, each of the arithmetic devices 5a, 5b, 5c, and 5d is communicatably connected to the input device 3 and the output device 4. Furthermore, the arithmetic devices 5a, 5b, 5c, and 5d are communicatably connected to one another via a second communication unit (second COM) 7 thereof. Although four arithmetic devices are provided in this embodiment, any number of arithmetic devices are acceptable, as long as two or more are provided. Furthermore, there is no specific limit to the maximum number of arithmetic devices.

In addition, although one input device 3 and one output device 4 are provided separately in this embodiment, this is not the only acceptable structure. For example, the input device 3 and the output device 4 may be integrated into one input/output device, as long as the integrated device can achieve the functions of the input device and output device. Alternatively, a plurality of the input devices 3 or the output devices 4 may be provided, and the input device or the output device to be used can be selected according to the control target. Furthermore, although this embodiment is described assuming that an actuator 2, which is to be operated to perform plant control, is controlled, the control target is not limited thereto.

The input device 3 includes a data acquiring unit 31 and a third communication unit (third COM) 32.

The data acquiring unit 31 acquires input data acquired from a sensor 1 provided in the control target. The input data acquired in the data acquiring unit 31 is output to the third communication unit 32. The third communication unit 32 sends the input data to each of the arithmetic devices 5a, 5b, 5c, and 5d.

The output device 4 includes a fourth communication unit (fourth COM) 41, an output data storage unit 42, an output data selecting unit 43, and a data output unit 44.

The fourth communication unit 41 acquires output data Ya, Yb, Yc, and Yd from the arithmetic devices 5a, 5b, 5c, and 5d, respectively, and stores these output data Ya, Yb, Yc, and Yd in the output data storage unit 42. As a result, the output data Ya, Yb, Yc, and Yd output from the fourth communication unit 41 are stored in the output data storage unit 42.

The output data selecting unit 43 reads out the output data Ya, Yb, Yc, and Yd stored in the output data storage unit 42, determines correct output data by a specified method based on these items of output data Ya, Yb, Yc, and Yd, and outputs them to the data output unit 44. The data output unit 44 outputs the acquired correct output data to the actuator 2, serving as the control target.

Figure 2:
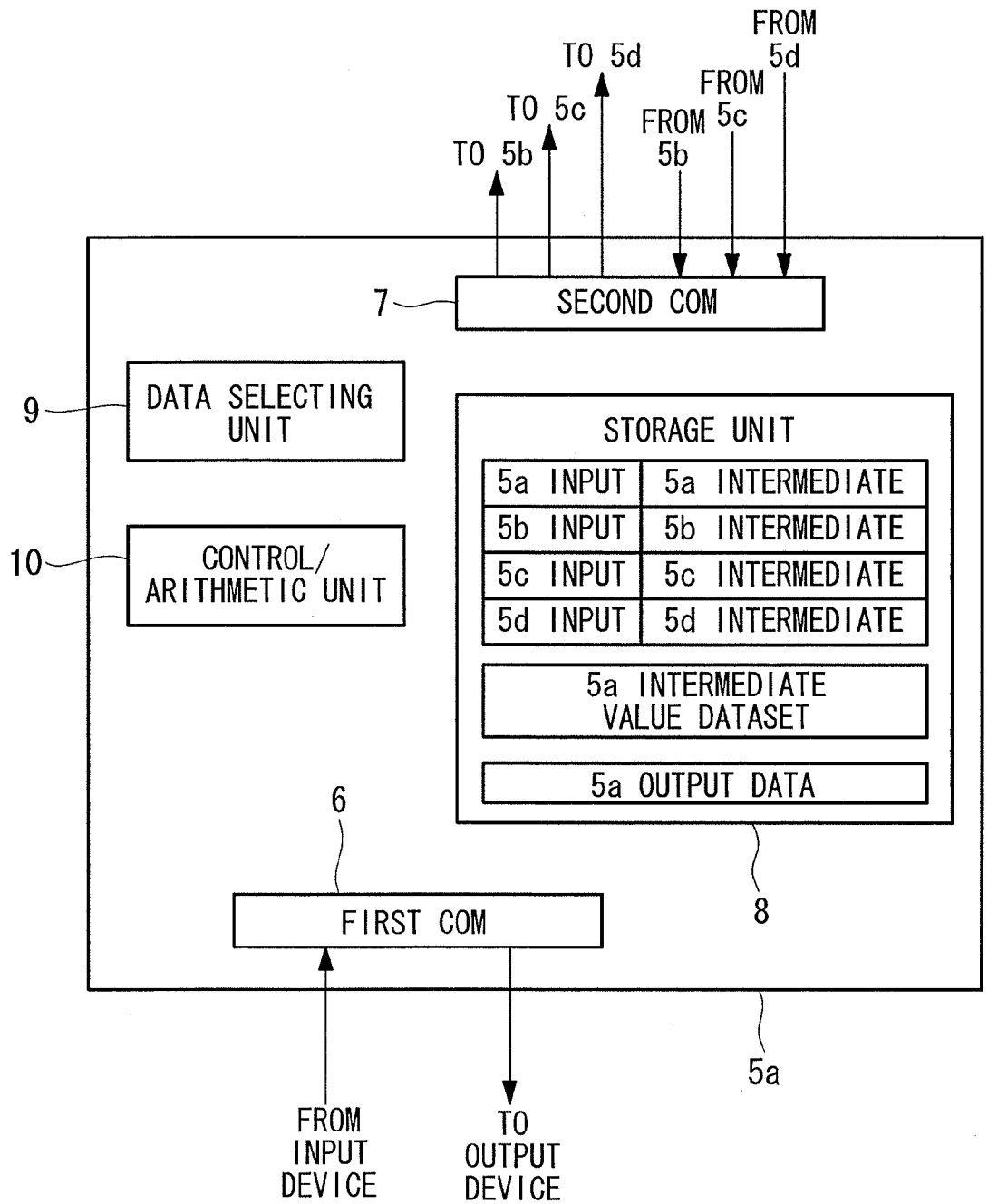
FIG. 2 is a functional block diagram of an arithmetic device according to the first embodiment.

FIG. 2 is a functional block diagram depicting, in an expanded format, the functions provided in the arithmetic device 5a. Because the other arithmetic devices 5b, 5c, and 5d have a similar function in this embodiment, attention is focused on the operation of the arithmetic device 5a as one example in the following description.

As shown in FIG. 2, the arithmetic device 5a includes the first communication unit 6, the second communication unit 7, a storage unit 8, a data selecting unit 9, and a control/arithmetic unit 10.

The first communication unit 6 receives input data from the input device 3 and stores it in the storage unit 8. The first communication unit 6 also sends the output data taken from the storage unit 8 to the output device 4. In this manner, the first communication unit 6 performs communication processing between the input device 3 and the arithmetic device 5a, as well as between the arithmetic device 5a and the output device 4. It is assumed that the input data input, for example, via the first communication unit 6 is denoted as Da, the input data input to the arithmetic device 5b is denoted as Db, the input data input to the arithmetic device 5c is denoted as Dc, and the input data input to the arithmetic device 5d is denoted as Dd.

When it is determined through the processing described below that the output data Ya (here, the output data from the arithmetic device $5x$ (x=a, b, c, d) is denoted as Yx) stored in the storage unit 8 (described in detail below) of the arithmetic device 5a is correct, the first communication unit 6 outputs the output data Ya to the output device 4. On the other hand, when it is determined that the output data Ya stored in the storage unit 8 is not correct, the first communication unit 6 sends error information for reporting a fault to the output device 4.

The second communication unit 7 sends the input data and an intermediate value dataset (described in detail below) stored in the storage unit 8 to the other arithmetic devices 5b, 5c, and 5d. The second communication unit 7 also receives the input data and intermediate value datasets of the other arithmetic devices, sent from the second communication units 7 of the other arithmetic devices 5b, 5c, and 5d, and stores them in the storage unit 8. In this manner, the second communication unit 7 performs communication processing between the arithmetic device 5a and the other arithmetic devices 5b, 5c, and 5d.

More specifically, the second communication unit 7 sends the input data Da to each of the other arithmetic devices 5b, 5c, and 5d and receives the input data Db, Dc, and Dd sent from the other arithmetic devices 5b, 5c, and 5d, respectively. In addition, the second communication unit 7 stores the received input data Db, Dc, and Dd in the storage unit 8.

The storage unit 8 stores the input data Da, Db, Dc, and Dd acquired by the arithmetic device 5a via the first communication unit 6 and the second communication unit 7. The storage unit 8 also stores intermediate value datasets Ca, Cb, Cc, and Cd acquired by the arithmetic device 5a via the first communication unit 6 and the second communication unit 7, described below.

The control/arithmetic unit 10 reads out from the storage unit 8 the input data Da and the intermediate value dataset Ca stored at the time of the previous arithmetic operation; performs a predetermined arithmetic operation based on the read-out input data Da and the intermediate value dataset Ca; and stores in the storage unit 8 the output data Ya obtained as a result of the arithmetic operation and the intermediate value dataset Ca updated as a result of this arithmetic operation.

In this embodiment, resultant data generated during the process of obtaining the output data Ya through a predetermined arithmetic operation is referred to as intermediate value data, and a series of intermediate value data items obtained until the acquisition of the output data Ya based on the input data Da are referred to as the intermediate value dataset Ca. The intermediate value dataset Ca includes, for example, integral values as previously accumulated data and a moving average.

If at least one of the input data that is destined for the device itself and received via the first communication unit 6 and the input data that is sent from the other arithmetic devices and received via the second communication unit 7 do not match, the data selecting unit 9 selects the value with the highest occurrence frequency as changed input data. More specifically, the data selecting unit 9 reads out and compares the input data Da, Db, Dc, and Dd stored in the storage unit 8 and selects correct input data based on the occurrence frequencies of these values.

For example, if the input data Da, Db, and Dc are equal and the input data Dd differs, then the input data Da, Db, and Dc with a high occurrence frequency are selected as the correct input data. Furthermore, if, for example, the input data Db, Dc, and Dd input from the second communication unit 7 are equal and the input data Da differs from the other input data in the arithmetic device 5a, then the input data Db, Dc, and Dd are selected as the correct input data so that the value of the incorrect input data Da is replaced with the input data Db (or Dc or Dd, which are equal to Db).

In this manner, of the input data acquired by the first communication unit 6 and the second communication unit 7 in the arithmetic device 5a, a value with a high occurrence frequency is selected as the correct value. Furthermore, if the input data Da input via the first communication unit 6 is not selected as the correct value, then the input data Da is replaced with the correct input data. By doing so, for example, even if an interruption of the communication occurs in the communication path between the input device 3 and the first communication unit 6, causing the input data Da acquired from the first communication unit 6 to become incorrect, the input data Da is replaced with the correct input data based on the input data Db, Dc, and Dd acquired from the other arithmetic devices 5b, 5c, and 5d. If the input data Da input via the first communication unit 6 is selected as the correct value, the value itself is stored as the input data Da in the storage unit 8.

In addition, if at least one of the intermediate value datasets Ca, Cb, Cc, and Cd stored in the storage unit 8 do not match, then the data selecting unit 9 selects the value with the highest occurrence frequency and sets the selected value as the correct intermediate value dataset. Furthermore, the data selecting unit 9 compares the intermediate value dataset determined as being correct with the intermediate value dataset Ca based on the input data Da and, if they do not match as a result of the comparison, determines that the output data Ya calculated based on the input data Da is not correct. This is because, if the intermediate value data Ca is incorrect, the output data obtained using that incorrect intermediate value data is also incorrect. In this case, the data selecting unit 9 changes the intermediate value dataset Ca to the correct intermediate value dataset and stores the changed intermediate value dataset in the storage unit 8. In this manner, as a result of the intermediate value dataset Ca being overwritten with the correct intermediate value dataset received from the other arithmetic devices, processing can be performed using the correct intermediate value data in a case, for example, where this intermediate value data is to be used during the subsequent processing.

In this embodiment, it is determined that "the intermediate value datasets match" when all of the corresponding items of intermediate value data match, as a result of comparing the items of the intermediate value data in the intermediate value datasets.

The operation of the redundant system 100 according to this embodiment will now be described with reference to FIGS. 3 and 4. Because the functions of the arithmetic devices 5a, 5b, 5c, and 5d are similar, as described above, attention is focused on the operation of the arithmetic device 5a in the following description.

Figure 3:
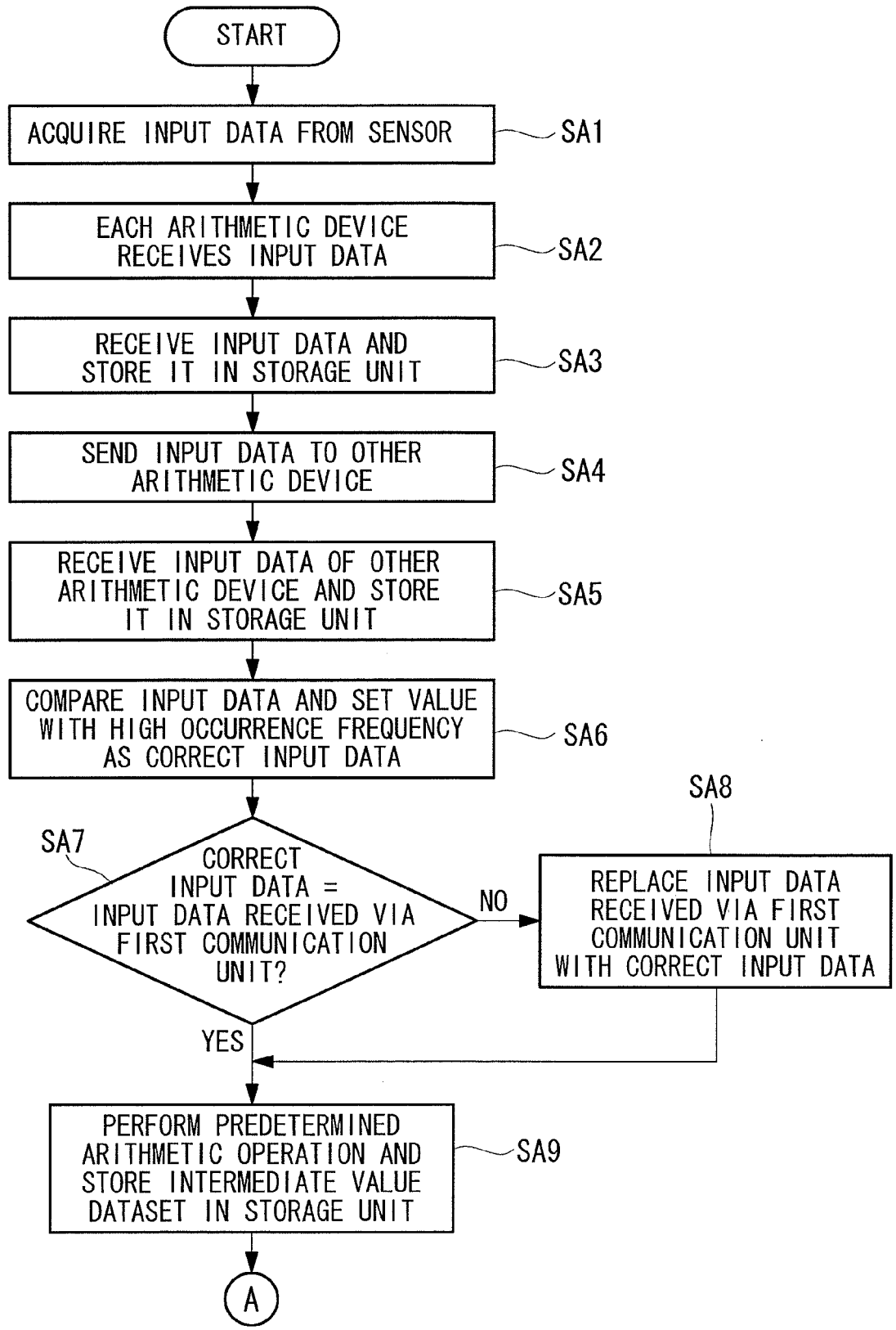
FIG. 3 shows an operating flow for the redundant system according to the first embodiment.

The value measured with the sensor 1 installed at each control target is input to the input device 3 as input data (step SA1 in FIG. 3). When acquired by the data acquiring unit 31 of the input device 3, the input data is output to the third communication unit 32 and is sent from the third communication unit 32 to the first communication unit 6 of each of the arithmetic devices 5a, 5b, 5c, and 5d (step SA2 in FIG. 3).

The input data sent from the input device 3 is received by the first communication unit 6 of the arithmetic device 5a and is stored in the storage unit 8 (step SA3 in FIG. 3). At this time, it is assumed that the input data received by the first communication unit 6 of the arithmetic device 5a is denoted as Da and that the input data received by the first communication units 6 of the arithmetic devices 5b, 5c, and 5d are denoted as Db, Dc, and Dd, respectively. The input data Da stored in the storage unit 8 is sent by the second communication unit 7 to the other arithmetic devices 5b, 5c, and 5d via a communication medium (step SA4 in FIG. 3).

Also, the input data Db, Dc, and Dd stored in the storage units 8 of the other arithmetic devices 5b, 5c, and 5d are sent from their respective second communication units 7 to the arithmetic device 5a via the communication medium and are received by the second communication unit 7 of the arithmetic device 5a. The input data Db, Dc, and Dd of the respective arithmetic devices received by the second communication unit 7 are stored in the storage unit 8 of the arithmetic device 5a (step SA5 in FIG. 3). By doing so, the input data Da, Db, Dc, and Dd received by the respective arithmetic devices 5a, 5b, 5c, and 5d are stored in the storage unit 8 of the arithmetic device 5a.

The input data Da, Db, Dc, and Dd stored in the storage unit 8 are read out by the data selecting unit 9, and then the values of the input data Da, Db, Dc, and Dd are compared. As a result, if at least one of the input data Da, Db, Dc, and Dd differs, then a value with a high occurrence frequency is selected as the correct input data in the data selecting unit 9 (step SA6 in FIG. 3). For example, if the input data Da, Db, and Dc are equal and the input data Dd differs from the other three input data Da, Db, Dc, then the input data Da, Db, Dc are selected as the correct value.

Subsequently, in the data selecting unit 9, it is determined whether the input data selected as the correct value matches the input data Da acquired via the first communication unit 6 (step SA7 in FIG. 3). If they do not match as a result of the determination, then the input data Da stored in the storage unit 8 is overwritten with the correct input data (step SA8 in FIG. 3). If all of the input data Da, Db, Dc, and Dd match, then the above-described overwriting operation is not performed.

In this manner, if the input data Da has been confirmed as being the correct value or is overwritten with the correct value, then the control/arithmetic unit 10 performs a predetermined arithmetic operation using this input data Da to obtain the output data Ya. Furthermore, a series of values obtained during an arithmetic operation for calculation of this output data Ya, as well as the output data Ya, are stored in the storage unit 8 as the intermediate value dataset Ca (step SA9 in FIG. 3).

Figure 4:
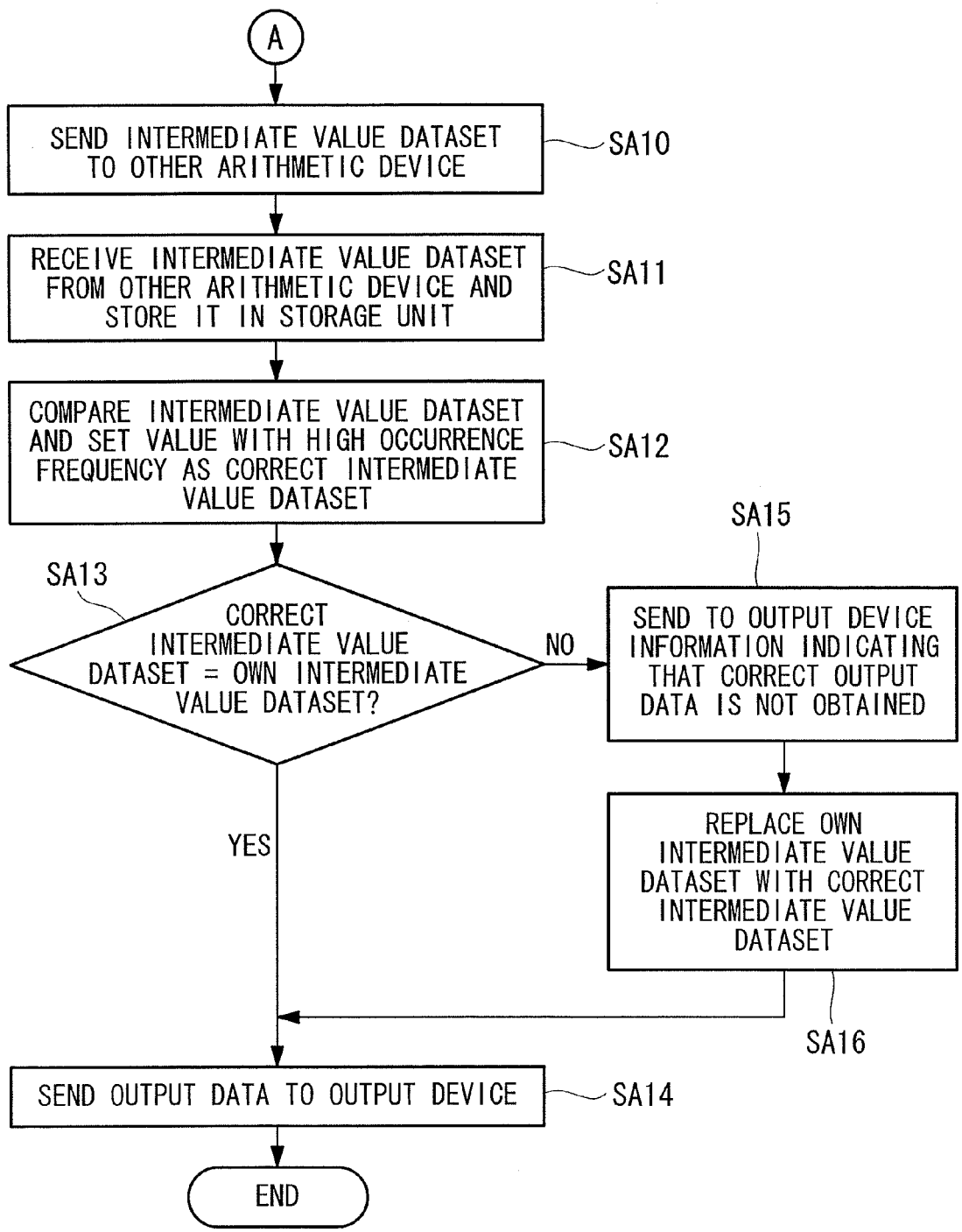
FIG. 4 shows an operating flow, continued from FIG. 3, for the redundant system according to the first embodiment.

When the above-described output data Ya has been calculated, the intermediate value dataset Ca stored in the storage unit 8 is sent to the other arithmetic devices 5*b*, 5*c*, and 5*d* via the second communication unit 7 (step SA10 in FIG. 4). Furthermore, the intermediate value datasets Cb, Cc, and Cd sent from the second communication units 7 of the other arithmetic devices 5*b*, 5*c*, and 5*d* are received by the second communication unit 7 of the arithmetic device 5*a* and are stored in the storage unit 8 (step SA11 in FIG. 4).

Subsequently, the intermediate value datasets Ca, Cb, Cc, and Cd stored in the storage unit 8 are read out by the data selecting unit 9 and are compared with one another so that an intermediate value dataset with a high occurrence frequency is selected as the correct intermediate value dataset (step SA12 in FIG. 4). Subsequently, the correct intermediate value dataset selected in the data selecting unit 9 is compared with the intermediate value dataset Ca that has been calculated and stored during the process of acquiring the output data Ya to determine whether they match (step SA13 in FIG. 4).

If matching is confirmed as a result of the above-described determination, the output data Ya that has been calculated by the control/arithmetic unit 10 and stored in the storage unit 8 is determined to be the correct output data and is then output to the output device 4 via the first communication unit 6 (step SA14 in FIG. 4).

On the other hand, if matching is not confirmed, the intermediate value dataset Ca stored in the storage unit 8 is overwritten with the correct intermediate value dataset (step SA16 in FIG. 4), and furthermore, information indicating that the correct output data Ya has not been obtained is sent to the output device 4 via the first communication unit 6 (step SA15 in FIG. 4).

In this manner, if either the output data Ya, Yb, Yc, and Yd or information indicating that correct output data has not been obtained are sent from the first communication units 6 of the arithmetic devices 5*a*, 5*b*, 5*c*, and 5*d* to the output device 4, then output data to be output to the actuator 2 is selected in the output device 4 and output to the actuator 2.

As described so far, according to the redundant system 100 of the present invention, input data acquired via the first communication units 6 are sent and received among the arithmetic devices 5*a*, 5*b*, 5*c*, and 5*d*, via the second communication unit 7. As a result, each of the arithmetic devices 5*a*, 5*b*, 5*c*, and 5*d* can acquire input data sent to another arithmetic device. Because of this, even if a communication failure occurs, for example, between the input device 3 and the first communication unit 6, preventing the acquisition of the input data from the input device, input data acquired by another arithmetic device via the second communication unit 7 can be obtained to ensure that input data can be acquired.

In addition, if input data with a high occurrence frequency is selected as correct (error-free) input data from among the sent and received input data and furthermore, if the input data input from the first communication unit 6 (namely, its own input data) differs from the correct input data, then that input data is overwritten with the correct data. Thus, because the correct input data is determined based on the occurrence frequency of the input data, the reliability of input data can be ensured, compared with the known method in which the average or low value is selected as input data.

Furthermore, in the control/arithmetic unit 10, the intermediate value dataset that is obtained during the process of calculating output data based on input data is sent and received among the arithmetic devices; the intermediate value datasets obtained in the arithmetic devices are compared with one another; and if at least one intermediate value dataset differs, the intermediate value dataset with the highest occurrence frequency is determined to be the correct intermediate value dataset. Thereafter, if its own intermediate value dataset does not match the correct intermediate value dataset, then the intermediate value dataset stored in the storage unit 8 is overwritten with the correct intermediate value dataset. Therefore, in a case, for example, where the intermediate value dataset is to be reused for subsequent processing, arithmetic processing can be performed using that correct intermediate value dataset.

Although, the input data and the intermediate value datasets that are sent and received among the arithmetic devices pass through the second communication unit 7 in this embodiment, the present invention is not limited thereto. For example, data may be sent and received among the arithmetic devices by another method, such as via shared memory.

{Second Embodiment}

Figure 5:
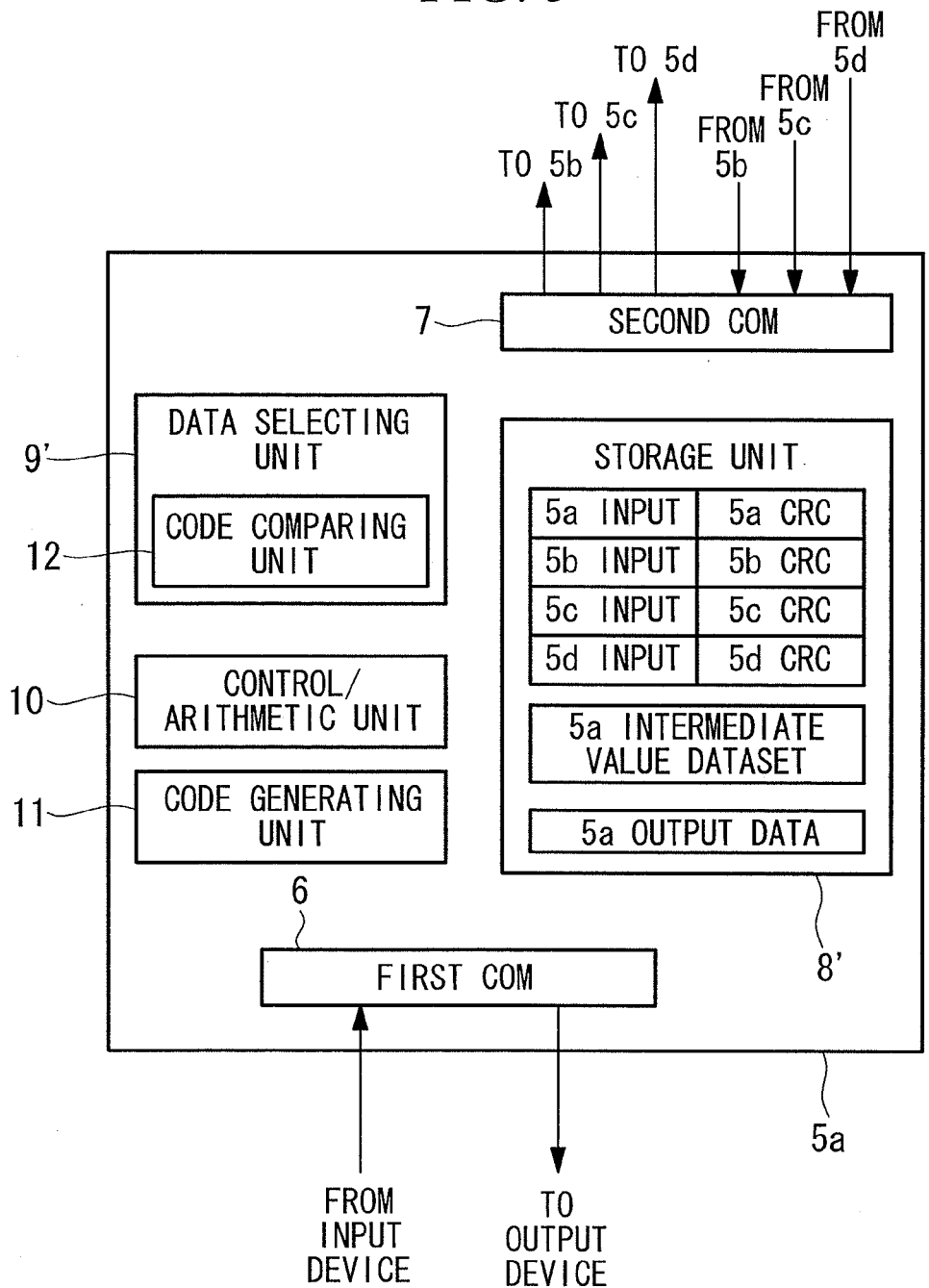
FIG. 5 is a functional block diagram of an arithmetic device according to a second embodiment.

Next, a redundant system according to a second embodiment of the present invention will now be described with reference to FIG. 5.

A redundant system 100' of this embodiment differs from the first embodiment in that a code generating unit 11 and a code comparing unit 12 are provided. For the redundant system 100' of this embodiment, a description of the commonalties with the first embodiment is omitted, and hence only differences will be described. Because the functions of the arithmetic devices 5*a*, 5*b*, 5*c*, and 5*d* are also similar in this embodiment, attention is focused on the operation of the arithmetic device 5*a* in the following description.

The code generating unit 11 generates one code Ra from the intermediate value dataset Ca stored in a storage unit 8'. Furthermore, the code generating unit 11 has a mechanism that generates the same code when all intermediate value data constituting an intermediate value dataset are identical. As a result, when code matching is achieved as a result of code comparison, it can be determined that all intermediate value data constituting the intermediate value dataset match. On the other hand, when code matching is not achieved, it can be determined that at least one of the intermediate value data constituting the intermediate value dataset does not match. The code Ra generated by the code generating unit 11 is stored in the storage unit 8' in association with the corresponding intermediate value dataset Ca.

For the above-described code, CRC (Cyclic Redundancy Check), for example, is used. Because CRC is a known technique, details, including the method of calculating a CRC, will not be described.

The second communication unit 7 sends the code Ra to the second communication units 7 of the other arithmetic devices 5b, 5c, and 5d via the communication medium. In addition, the codes sent from the other arithmetic devices 5b, 5c, and 5d are received by the second communication unit 7 of the arithmetic device 5a via the communication medium and are then stored in the storage unit 8'.

The code comparing unit 12, which is provided in a data selecting unit 9', compares the codes Ra, Rb, Rc, and Rd acquired from the respective arithmetic devices 5a, 5b, 5c, and 5d stored in the storage unit 8'. If at least one does not match, the value of the code with the highest occurrence frequency is determined to be the correct code.

In addition, if the code determined to be the correct code differs from its own code (the code Ra of the arithmetic device 5a), the code comparing unit 12 determines that the output data Ya calculated by the device itself is not correct. In this case, the second communication unit 7 receives the intermediate value dataset from another arithmetic device, serving as a transfer source, of the code determined as being correct, and updates its own intermediate value dataset stored in the storage unit 8' with the intermediate value dataset received by the second communication unit 7.

The operation of the redundant system 100' according to this embodiment will now be described with reference to FIG. 6. Here, the operation will be described by way of an example where four arithmetic devices are provided. Because the operation up to step SA9 in the first embodiment, where an intermediate value dataset is obtained by the control/arithmetic unit 10 and stored in the storage unit 8', is the same, a description thereof will be omitted, and hence attention will be focused on the differences from the first embodiment.

When an intermediate value dataset and the output data are written into the storage unit 8' (step SA9 in FIG. 3) after arithmetic operations by the control/arithmetic unit 10 have been completed, the intermediate value dataset Ca is read out by the code generating unit 11 and the code Ra is generated. The code generating unit 11 stores the generated code Ra and the intermediate value dataset Ca in the storage unit 8' in association with each other (step SB1), and the code Ra is then sent by the second communication unit 7 to the other arithmetic devices 5b, 5c, and 5d (step SB2). Furthermore, the codes Rb, Rc, and Rd sent by the second communication units 7 of the other arithmetic devices 5b, 5c, and 5d are received by the second communication unit 7 of the arithmetic device 5a and are stored in the storage unit 8' together with the information about the transfer source that has sent the codes Rb, Rc, and Rd (step SB3).

The codes Ra, Rb, Rc, and Rd stored in the storage unit 8' are read out by the code comparing unit 12 of the data selecting unit 9' and are compared with one another to determine whether all codes Ra, Rb, Rc, and Rd match. If matching is not achieved, a code with a high occurrence frequency is selected as the correct code (step SB4). Subsequently, it is determined whether the selected correct code matches the device's own code Ra (step SB5).

If matching is confirmed as a result of the above-described determination, the output data Ya that has been calculated by the control/arithmetic unit 10 and stored in the storage unit 8' is determined to be the correct output data and is then output to the output device 4 via the first communication unit 6 (step SB6), thus completing this processing.

On the other hand, if matching is not achieved, then the output data Ya stored in the storage unit 8' is determined as not being correct output data by the data selecting unit 9, and information indicating that correct output data has not been obtained is output to the output device 4 via the first communication unit 6 (step SB7). In addition, if the output data Ya is determined as not being correct, the intermediate value dataset is received from the arithmetic device, serving as the above-described transfer source of the code with high occurrence frequency, via the second communication unit 7. Then, the intermediate value dataset Ca in the storage unit 8' is overwritten with this received intermediate value dataset (step SB8).

As described so far, according to the redundant system 100' of this embodiment, the reliability of the output data is evaluated using the codes Ra, Rb, Rc, and Rd generated from the intermediate value datasets, instead of evaluating the reliability of the output data by sending and receiving intermediate value datasets themselves among the arithmetic devices, as in the above-described first embodiment. Therefore, it is possible to reduce the amount of transferred and received data, as well as the load imposed by data applied to the communication medium.

Furthermore, when the intermediate value datasets are to be compared among the arithmetic devices, it can be determined whether an intermediate value dataset differs merely by comparing a single code. Therefore, it is possible to further reduce the processing load compared with when intermediate value datasets containing a plurality of intermediate value data items are compared.

Furthermore, if the device's own code differs from the code determined as being correct, the intermediate value dataset itself is received from the arithmetic device, serving as the transfer source of the correct code, to update the incorrect intermediate value dataset stored in the storage unit 8' with the correct intermediate value dataset. Therefore, in a case where an intermediate value dataset is needed again, for example, for the subsequent processing, processing can be performed using the correct intermediate value data.

{Modification}

In this embodiment, the only information that is sent and received by the second communication unit 7 when intermediate value datasets are to be compared among the arithmetic devices is codes. However, the present invention is not limited to this. For example, intermediate value datasets and codes may be combined for transfer and reception among the arithmetic devices via the second communication unit 7. When either intermediate value datasets or codes are to be sent and received, the processing time by the arithmetic devices varies depending on whether non-matching is detected or not. On the other hand, variations in the processing time can be suppressed by sending and receiving both intermediate value datasets and codes, and this makes the present invention suitable for an arithmetic device that requires real-time characteristics.

Furthermore, intermediate value datasets are sent and received in advance, substantially at the same time that codes are sent and received among the arithmetic devices. By doing so, the time spent until an intermediate value dataset is output to the output device 4 can be reduced, compared with a case where an intermediate value dataset is received from the arithmetic device, serving as the transfer source of the correct code, each time the device's own code does not match the correct code.

{Reference Signs List}
3 input device
4 output device
5a, 5b, 5c, 5d arithmetic device
6 first communication unit
7 second communication unit
8, 8' storage unit
9, 9' data selecting unit
10 control/arithmetic unit
11 code generating unit
12 code comparing unit
100 redundant system

The invention claimed is:

1. A redundant system comprising: an input device; a plurality of arithmetic devices that receive input data from the input device; and an output device that receives output data output from the arithmetic devices, the redundant system causing the arithmetic devices to perform the same processing, wherein
each of the arithmetic devices includes:
a first communication unit that acquires the input data from the input device;
a second communication unit that sends the input data acquired by the first communication unit to other arithmetic device and receives the input data acquired by the other arithmetic device from the other arithmetic device;
a control/arithmetic unit that calculates the output data by performing a predetermined arithmetic operation based on the input data; and
a storage unit that stores an intermediate value dataset, which is a plurality of data items obtained during the process of calculating the output data, wherein
the second communication unit sends the intermediate value dataset stored in the storage unit to the other arithmetic device and receives the intermediate value dataset sent from the other arithmetic device,
the storage unit stores the intermediate value data received from the other arithmetic device in association with the input data, and
the redundant system further comprises at least three of the arithmetic devices, wherein
each of the arithmetic devices includes a data selecting unit that, if at least one of the input data acquired via the first communication unit and the second communication unit does not match, selects a value with the highest occurrence frequency from among at least three of the input data as changed input data, and
the data selecting unit, if at least one of a plurality of the intermediate value datasets stored in the storage unit does not match, selects a value with the highest occurrence frequency from among the intermediate value datasets as a changed intermediate value dataset and, if the selected intermediate value dataset differs from the intermediate value dataset based on the input data acquired via the first communication unit, determines that the output data calculated from the input data acquired via the first communication unit is not correct and sets the intermediate value dataset with the highest occurrence frequency as a changed intermediate value dataset.

2. A redundant system comprising:
an input device;
a plurality of arithmetic devices that receive input data from the input device; and
an output device that receives output data output from the arithmetic devices, the redundant system causing the arithmetic devices to perform the same processing, wherein
each of the arithmetic devices includes:
a first communication unit that acquires the input data from the input device;
a second communication unit that sends the input data acquired by the first communication unit to other arithmetic device and receives the input data acquired by the other arithmetic device from the other arithmetic device;
a control/arithmetic unit that calculates the output data by performing a predetermined arithmetic operation based on the input data;
a storage unit that stores an intermediate value dataset, which is a plurality of data items obtained during the process of calculating the output data; and
a code generating unit that generates one code from the intermediate value dataset stored in the storage unit, wherein
the code generating unit generates the same code for the same intermediate value dataset;
the storage unit stores the code and the input data in association with each other; and
the second communication unit sends the code stored in the storage unit to the other arithmetic device and acquires the code from the other arithmetic device to store the code in the storage unit in association with the input data acquired from the other arithmetic device.

3. The redundant system according to claim 2, comprising:
at least three of the arithmetic devices, wherein
each of the arithmetic devices includes a data selecting unit that, if at least one of the input data acquired via the first communication unit and the second communication unit does not match, selects a value with the highest occurrence frequency from among at least three of the input data as changed input data,
wherein the data selecting unit, if at least one of the codes stored in the storage unit does not match, determines that a value with the highest occurrence frequency from among the codes is the correct code and, if the code determined as being correct differs from its own code, determines that the output data calculated by itself is not correct, in which case the second communication unit receives the intermediate value dataset from the other arithmetic device, serving as a transfer source of the code determined as being correct, and its own intermediate value dataset stored in the storage unit is updated with the intermediate value dataset received by the second communication unit.

4. The redundant system according to claim 2, comprising:
at least three of the arithmetic devices, wherein
each of the arithmetic devices includes a data selecting unit that, if at least one of the input data acquired via the first communication unit and the second communication unit does not match, selects a value with the highest occurrence frequency from among at least three of the input data as changed input data.

5. A redundant system comprising:
an input device;
a plurality of arithmetic devices that receive input data from the input device; and
an output device that receives output data output from the arithmetic devices, the redundant system causing the arithmetic devices to perform the same processing, wherein each of the arithmetic devices includes:
- a first communication unit that acquires the input data from the input device:
- a second communication unit that sends the input data acquired by the first communication unit to other arithmetic device and receives the input data acquired by the other arithmetic device from the other arithmetic device;
- a control/arithmetic unit that calculates the output data by performing a predetermined arithmetic operation based on the input data;
- a storage unit that stores an intermediate value dataset, which is a plurality of data items obtained during the process of calculating the output data; and
- a code generating unit that generates one code from the intermediate value dataset stored in the storage unit, wherein the code generating unit generates the same code for the same intermediate value dataset;

the storage unit stores the code and the input data in association with each other; and the second communication unit sends the code and the intermediate value dataset stored in the storage unit to the other arithmetic device and acquires the code and the intermediate value dataset from the other arithmetic device and stores the code and the intermediate value dataset in the storage unit in association with the input data acquired from the other arithmetic device.

6. The redundant system according to claim 5, comprising:
at least three of the arithmetic devices, wherein
each of the arithmetic devices includes a data selecting unit that, if at least one of the input data acquired via the first communication unit and the second communication unit does not match, selects a value with the highest occurrence frequency from among at least three of the input data as changed input data,
wherein the data selecting unit, if at least one of the codes stored in the storage unit does not match, determines that a value with the highest occurrence frequency from among the codes is the correct code and, if the code determined as being correct differs from its own code, determines that the output data calculated by itself is not correct, in which case the intermediate value dataset from the same transfer source as that of the code determined as being correct is read out from the storage unit, and its own intermediate value dataset stored in the storage unit is updated with the intermediate value dataset read out from the storage unit.

7. The redundant system according to claim 5, comprising:
at least three of the arithmetic devices, wherein
each of the arithmetic devices includes a data selecting unit that, if at least one of the input data acquired via the first communication unit and the second communication unit does not match, selects a value with the highest occurrence frequency from among at least three of the input data as changed input data.

* * * * *